United States Patent
Hauru et al.

(10) Patent No.: US 10,199,937 B1
(45) Date of Patent: Feb. 5, 2019

(54) METHODS AND APPARATUS TO DIGITALLY CONTROL PULSE FREQUENCY MODULATION PULSES IN POWER CONVERTERS

(71) Applicant: Texas Instruments Incorporated, Dallas, TX (US)

(72) Inventors: Juha Olavi Hauru, Oulu (FI); Janne Matias Pahkala, Oulu (FI); Ari Kalevi Väänänen, Oulu (FI)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/948,813

(22) Filed: Apr. 9, 2018

(51) Int. Cl.
| | |
|---|---|
| *G05F 1/56* | (2006.01) |
| *H02M 3/157* | (2006.01) |
| *H02M 1/08* | (2006.01) |
| *H02M 3/158* | (2006.01) |

(52) U.S. Cl.
CPC ............. *H02M 3/157* (2013.01); *H02M 1/08* (2013.01); *H02M 3/158* (2013.01)

(58) Field of Classification Search
CPC ....................................................... G05F 1/56
USPC ........................................ 323/271–289, 315
See application file for complete search history.

(56) References Cited

U.S. PATENT DOCUMENTS

| 7,414,438 B1 * | 8/2008 | Nulsen ................. H03K 5/1252 324/76.25 |
|---|---|---|
| 7,863,992 B2 * | 1/2011 | Chung ................... H03K 4/501 327/131 |
| 9,316,681 B2 * | 4/2016 | Sicard ................. G01R 31/2601 |
| 9,929,653 B1 * | 3/2018 | Mercer .................. H02M 3/158 |
| 9,998,126 B1 * | 6/2018 | Hailu ....................... G04F 10/00 |
| 2002/0014901 A1 * | 2/2002 | Miyano ..................... H03K 5/08 327/150 |
| 2002/0141209 A1 * | 10/2002 | Bridge .............. H02M 3/33592 363/89 |
| 2003/0179611 A1 * | 9/2003 | Liou ........................ G11C 7/04 365/193 |
| 2009/0067268 A1 * | 3/2009 | Seo ...................... G11C 7/1051 365/193 |
| 2009/0184668 A1 * | 7/2009 | Mednik .............. H05B 33/0815 315/297 |

(Continued)

*Primary Examiner* — Adolf Berhane
*Assistant Examiner* — Nusrat Quddus
(74) *Attorney, Agent, or Firm* — Tuenlap D. Chan; Charles A. Brill; Frank D. Cimino

(57) ABSTRACT

Methods and apparatus to digitally control pulse frequency modulation pulses in power converters are disclosed. An example apparatus includes a low-side controller structured to, when an inductor current corresponds to a first current direction during a low-side control signal of a power converter, decrease a first duration of the low-side control after the first duration; and when the inductor current corresponds to a second current direction during the low-side control signal of the power converter, increase the first duration of the low-side control after the first duration; and a high-side controller structured to, when a sum of the first duration and a second duration corresponding to a high-side control of the power converter does not satisfy target pulse length, increase a third duration of the high-side control after the third duration; and when the sum of the first duration and the second duration satisfies the target pulse length, decrease the third duration of the subsequent high-side control.

20 Claims, 7 Drawing Sheets

(56) References Cited

U.S. PATENT DOCUMENTS

| | | | |
|---|---|---|---|
| 2009/0296800 A1* | 12/2009 | Tseng | H04L 27/2647 |
| | | | 375/232 |
| 2010/0327833 A1* | 12/2010 | Singnurkar | H02M 3/1582 |
| | | | 323/282 |
| 2011/0121755 A1* | 5/2011 | Han | H05B 33/0815 |
| | | | 315/294 |
| 2012/0119715 A1* | 5/2012 | Loikkanen | H02M 3/1582 |
| | | | 323/235 |
| 2014/0050284 A1* | 2/2014 | Byeon | H04L 7/0331 |
| | | | 375/316 |
| 2016/0025802 A1* | 1/2016 | Sicard | G01R 31/2608 |
| | | | 324/762.08 |

* cited by examiner

METHODS AND APPARATUS TO DIGITALLY CONTROL PULSE FREQUENCY MODULATION PULSES IN POWER CONVERTERS

FIELD OF THE DISCLOSURE

This disclosure relates generally to power converters and, more particularly, to methods and apparatus to digitally control pulse frequency modulation pulses in power converters.

BACKGROUND

A power converter is a circuit that is used in various devices to convert an input voltage to a desired output voltage. For example, a buck converter converts an input voltage into a lower output voltage by controlling transistors and/or switches to charge and/or discharge inductors and/or capacitors to maintain the desired output voltage. Some power converters may operate in pulse frequency modulation (PFM) to optimize light load efficiency (e.g., in a low power mode). PFM is a pulse-based operation where generated current pulses are used to optimize efficiency while keeping the output voltage ripple at an acceptable level.

SUMMARY

Certain examples disclosed herein digitally control pulse frequency modulation pulses in power converters. An example apparatus includes a low-side (LS) controller to when an inductor current is negative during low-side control of a power converter, decrease a first duration of a subsequent low-side control; and when the inductor current is positive during the low-side control of the power converter, increase the first duration of the subsequent low-side control. The example apparatus further includes a high-side (HS) controller to when a combination of (a) the first duration and (b) a second duration corresponding to a high-side control of the power converter does not satisfy target pulse length, decrease a third duration of a subsequent high-side control; and when the combination of the first duration and the second duration satisfies the target pulse length, increase the third duration of the subsequent high-side control.

Certain examples disclosed herein digitally control pulse frequency modulation pulses in power converters. An example apparatus includes a first comparator with a first comparator output coupled to a first latch and a first digitally controlled delay, the first comparator receiving an output voltage of a power converter and a target output voltage. The example apparatus further includes a high-side controller coupled to a low-side controller output of a low-side controller. The example apparatus further includes the first digitally controlled delay coupled to a high-side controller output of the high-side controller. The example apparatus further includes the first latch coupled to a first digitally controlled delay output form the first digitally controlled delay. The example apparatus further includes a driver coupled to a first latch output of the first latch, the driver to drive at least one of a first transistor or a second transistor to control an output voltage of a power converter.

Certain examples disclosed herein digitally control pulse frequency modulation pulses in power converters. An example method includes, when an inductor current is negative during low-side control of a power converter, decreasing, by executing an instruction with a processor, a first duration of a subsequent low-side control. The example method further includes, when the inductor current is positive during the low-side control of the power converter, increasing, by executing an instruction with the processor, the first duration of the subsequent low-side control. The example method further includes, when a sum of (a) the first duration and (b) a second duration corresponding to a high-side control of the power converter does not satisfy target pulse length, decreasing, by executing an instruction with the processor, a third duration of a subsequent high-side control. The example method further includes, when the sum of the first duration and the second duration satisfies the target pulse length, increasing, by executing an instruction with the processor, the third duration of the subsequent high-side control.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Power converters, such as buck converters, may operate in a PFM mode to optimize light load efficiency during low power operation. PFM includes toggling between high-side control, low-side control, and high impedance control of the buck converter. High-side control includes enabling a high-side transistor to increase an output voltage and an inductor current of the power converter. Low-side control includes enabling the low-side transistor to decrease inductor current of the power converter. High impedance mode include disabling the high-side and low-side transistors to force the inductor current to zero.

To keep PFM peak current (e.g., the highest inductor current during PFM control) at an acceptable level required for a HS switch conducing time, the duration of a pulse used for HS control (e.g., the HS length or the HS conducting state) may be small when the inductor inductance is small. For example, if the inductance of the inductor of a buck converter is 40 nanohenrys, where the input voltage is 5 Volts (V), the output voltage is 1 V, and the peak IL is 1 ampere, the HS length needs to be limited to 10 nanoseconds. Conventional techniques for generating a HS length include analog based technique that may not be capable of generating pulses corresponding to such smalls HS length because such techniques suffer from start-up time issues for the analog components. However, buck converts with smaller inductors and higher switching frequencies are desired. Such buck converters require nearly instant reaction times in PFM and HS lengths in the nanoseconds range. Examples disclosed provide a digital PFM solution to meet such requirements.

Examples disclosed herein generate a constant on time (or a substantially constant on time), thereby making it possible to generate very short HS lengths that consume very little quiescent current. Examples disclosed herein include digitally generating PFM control of a power converter while minimizing inductor current ripple variations. Inductor current ripple variations occur when input voltage and output voltage vary with time. Examples disclosed herein adjust the HS control duration and/or LS control duration to maintain a more constant PFM pulse length, regardless of variations in input and/or output voltage, thereby minimizing the inductor current ripple variations. Using examples disclosed herein, HS control lengths in the nanosecond range that minimize inductor current ripple variations cause by variation in input and/or output voltages of a power converter can be achieved.

Figure 1:
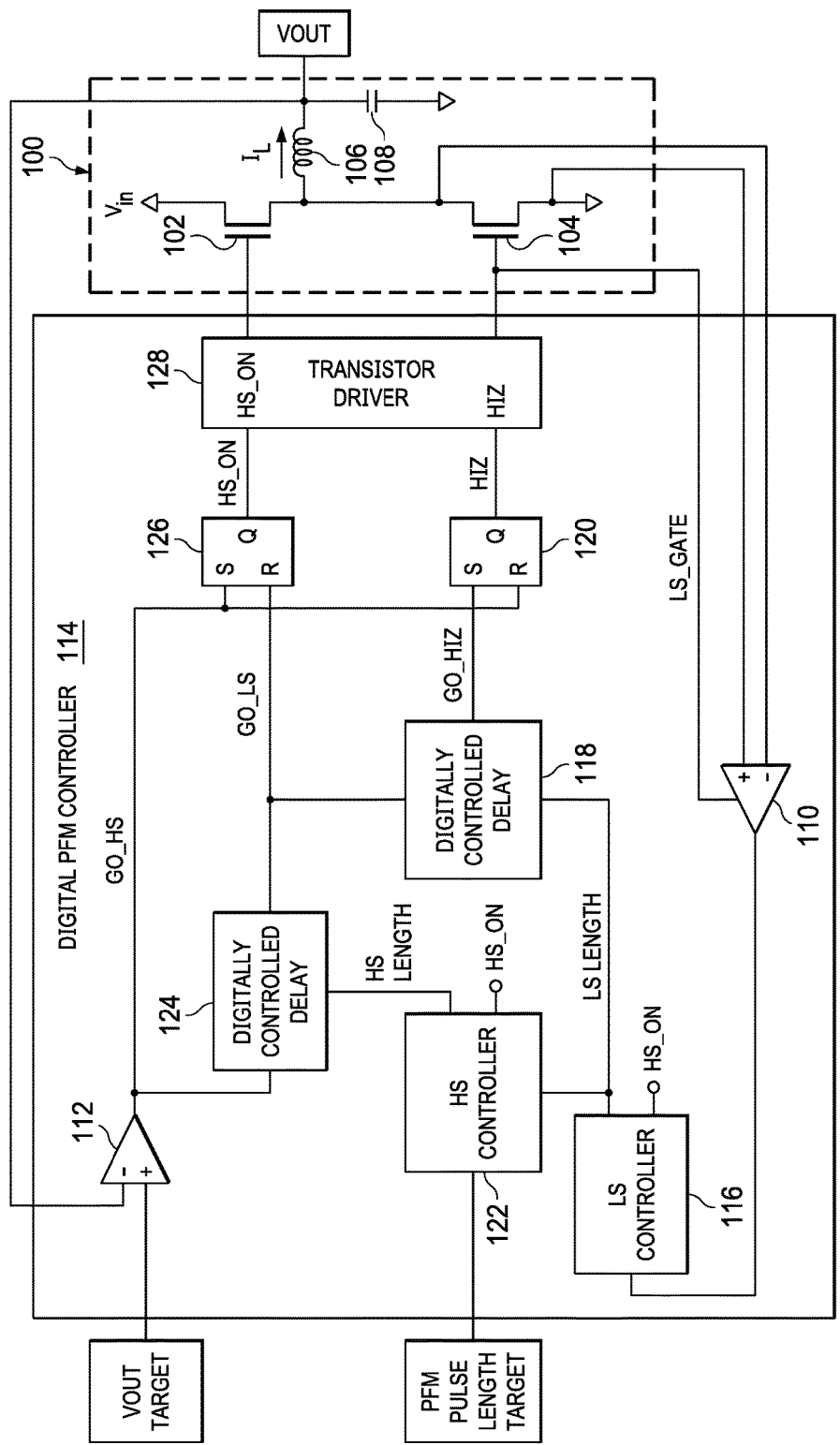
FIG. 1 is an illustration of an example buck converter that is digitally controlled using PFM pulses.

FIG. 1 illustrates an example buck converter 100 that is digitally controlled using PFM pulses. FIG. 1 includes the example buck converter 100, an example HS transistor 102, an example low-side transistor 104, an example inductor 106, an example capacitor 108, example comparators 110, 112, an example digital PFM controller 114, an example LS controller 116, example digitally controlled delays 118, 124, example latches 120, 126, an example HS controller 122, and an example transistor driver 128. Although the example digital PFM controller 114 is controlling the example buck converter 100, the digital PFM controller 114 may be used to control any type of power converter.

The example buck converter 100 of FIG. 1 includes the example high-side transistor 102 and the example low-side transistor 104. The example transistors 102, 104 can be enabled/disabled to increase/decrease the output voltage (Vout) by charging/discharging the example inductor 106 and/or the example capacitor 108. For example, when the example HS transistor 102 is enabled (e.g., by applying a high signal to the gate of the example transistor 102) and the example LS transistor 104 is disabled (e.g., by applying a low signal to the gate of the example transistor 104), the input voltage (Vin) charges the example inductor 106, thereby causing the inductor current to increase. When the example HS transistor 102 is disabled (e.g., by applying a low signal to the gate of the example transistor 102) and the example LS transistor 104 is enabled (e.g., by applying a high signal to the gate of the example transistor 104), the example inductor 106 discharge, thereby causing the inductor current to decrease. The output voltage of the example buck converter 100 is input into the example comparator 112, as further described below. The inductor current (IL) is also measured to determine when the low-side body diode of the example LS transistor 104 is conducting after the example LS transistor 104 is disabled, as further described below.

The example latch comparator 110 of FIG. 1 compares the voltage difference between the source and drain of the example LS transistor 104 after the LS transistor 104 is disabled to determine if the body diode of the example LS transistor 104 is conducting (e.g., if the inductor current is positive or negative). In some examples, the latch comparator 110 compares the inputs (e.g., the voltage source and drain of the example LS transistor 104) at the falling edge of the voltage applied to the gate of the LS transistor 104 (e.g., at the LS_gate node) and holds its output until a subsequent measurement (e.g., a subsequent falling edge at the gate of the LS transistor 104). For example, if, during the falling edge of the voltage at the LS_gate node, IL is negative, the example latch comparator 110 will output a low voltage (e.g., 0 V at the LS_comp_out node). If, during the falling edge of the voltage at the LS_gate node, IL is always positive, the example latch comparator 110 will output a high voltage (e.g., 3.2 V at the LS_comp_out node). Alternatively, the example comparator 110 may trigger and hold a comparison at the rising edge of the voltage at the high impedance (HIZ) node. The output of the latch comparator 110 (e.g., LS_comp_out) is input into the example LS controller 116, as further described below.

The example comparator 112 of FIG. 1 compares the Vout to a target Vout. In this manner, when the Vout becomes a voltage below the target Vout, the example comparator 112 outputs a high voltage pulse on the Go_HS node, which is used by the example digital PFM controller 114 to trigger the example transistor driver 128 to enable high-side control (e.g., enabling the example HS transistor 102 and disabling the example LS transistor 104), thereby increasing the inductor current. Additionally, the rising edge of the voltage output of the example comparator 112 at the Go_HS node may be used to trigger a low-side control and high impedance control after some delay, as further described below.

The example LS controller 116 of FIG. 1 increases and/or decreases the length of LS control (e.g., the pulse used to enable the example LS transistor 104) based on the output of the example latch comparator 110. For example, when the output of the latch comparator 110 is a low voltage (e.g., corresponding a negative IL), the example LS controller 116 reduces the LS control pulse duration that corresponds to the duration of time for the LS control. When the output of the latch comparator 110 is a high voltage (e.g., corresponding to a positive IL), the example LS controller 116 increases the LS control pulse duration that corresponds to the duration of time for the LS control. The LS controller 116 transmits a signal corresponding to the LS control pulse duration is output at the example LS_length node to the example digital controlled delay 118 and the example HS controller 122.

The example digitally controlled delay 118 of FIG. 1 outputs a HIZ trigger based on the low pulse duration from the example LS controller 116. HIZ is a mode that is enabled for a duration of time during a PFM between the LS control and the HS control to generate zero inductor current. When the HIZ mode is triggered, the example transistor driver 128 disables the example transistors 102, 104. The output of the example digitally controlled delay outputs a trigger (e.g., a high voltage pulse) on the Go_HIZ node to initiate the HIZ mode after the LS control based on the LS_length.

The example latch 120 of FIG. 1 transmits a signal corresponding to a HIZ interrupt on the HIZ node when the latch 120 receives a pulse at the set input via the Go_HIZ node. For example, when the digital controlled delay 118 outputs the pulse to initiate HIZ mode of the example buck converter 100, the example latch 120 receives the pulse and outputs a high voltage at the HIZ node until the latch 120 is reset. The example latch 120 is reset when the output of the example comparator 112 (e.g., received at the reset input of the latch 120) pulses high, indicating that a subsequent HS control should begin to increase the Vout. The output of the latch 120 is received by the example transistor driver 128.

The example HS controller 122 of FIG. 1 increases and/or decreases the length of the HS control (e.g., the pulse used to enable the example HS transistor 102) based on a target PFM pulse length and the LS control pulse duration from the example LS controller 116. The target PFM pulse length is a preset value. In some examples, the target PFM pulse length is based on a pulse width modulation (PWM) mode of the buck converter 100. For example, the PFM pulse length may be based on the period of the PWM mode, so that the period of the PWM mode corresponds to (e.g., is similar to or corresponds to a multiplier of) the PFM pulse length of the PFM mode (e.g., the target PFM pulse length may be 1.5 times the period of the PWM mode). The example HS controller 122 combines (e.g., sums) LS control pulse duration and the HS control pulse duration and adjusts the HS control pulse duration based on a comparison of the combination with the target PFM pulse length. For example, when the combination of the LS control pulse duration and the HS control pulse duration is less than the target PFM pulse length, the example HS controller 122 increases the HS length and, when the combination of the LS control pulse duration and the HS control pulse duration is more than the target PFM pulse length, the example HS controller 122 decreases the HS length. The output of the HS controller 122 (e.g., at the HS_length node) corresponds to the length of the HS control (e.g., for a subsequent HS control pulse) and is received by the example digitally controlled delay 124. The example digitally controlled delay 124 ends the HS control by outputting a pulse on the Go_LS node to trigger LS control after the HS control has ended.

The example latch 126 of FIG. 1 transmits a signal corresponding to HS/LS control based on the signal at the Go_HS node (e.g., corresponding to a pulse at the output of the comparator 112) and/or the Go_LS node (e.g., corresponding to a pulse at the output of the digitally controlled delay 124). For example, when the output of the comparator 112 pulses to a high voltage, the latch 126 outputs a high voltage at the HS_on node to initiate HS control of the example buck converter 100. Once the latch 126 is set, the latch 126 is reset (e.g., to output a low voltage at the HS_on node) when a pulse is received at the Go_LS node, thereby initiating LS control of the example buck converter 100. The output of the latch 126 is received by the example transistor driver 128.

The example transistor driver 128 of FIG. 1 enables HS control, LS control, and HIZ control of the example buck converter 100 by transmitting control voltages to enable and/or disable the example HS transistor 102 and/or the example LS transistor 104. For example, when the output of the example latch 126 is a high voltage and the output of the example latch 120 is a low voltage, the example transistor driver 128 enables (e.g., by transmitting a high voltage to the gate of) the example HS transistor 102 and disables (e.g., by transmitting a low voltage to the gate of) the example LS transistor 104 to enable HS control, thereby increasing the inductor current in order to increase output voltage. When the output of the example latch 126 is a low voltage and the output of the example latch 120 is a low voltage, the example transistor driver 128 disables the example HS transistor 102 and enables the example LS transistor 104 to enable LS control, thereby decreasing the inductor current. When the output of the latch 120 is high, the example transistor driver 128 disables both the HS and LS transistors 102, 104 to enable HIZ mode, thereby reducing the current to zero.

In operation, the HS pulse duration and the LS pulse duration are initialized to a preset value. In some examples, the HS pulse duration and the LS pulse duration correspond to the HS pulse duration and/or LS pulse duration used during a prior mode of operation (e.g., pulse width modulation mode). In such examples, the HS and LS pulse durations may be the same or a multiplier of the HS and LS pulse durations used during the pulse width modulation mode. When the example comparator 112 determines that the Vout is below the target Vout, the comparator 112 outputs a voltage pulse to set the example latch 126 and reset the example latch 120. In this manner, the example latch 126 outputs a high voltage to the example transistor driver 128 and the example latch 120 outputs a low voltage to the example transistor driver 128, causing the transistor driver 128 to initiate HS control of the example buck converter 100. Additionally, the example comparator 112 outputs the voltage pulse to the example digitally controlled delay 124, which outputs a voltage pulse at the Go_LS node based on a delay corresponding to the HS pulse duration.

The voltage pulse at the Go_LS node causes the example latch 126 to reset and reduce the output voltage of the latch 126 at the HS_on node to a low voltage, thereby causing the example transistor driver 128 to initiate LS control of the example buck converter 100. Additionally, the voltage pulse at the Go_LS node is input into the example digitally controlled delay 118 which, in response to receiving the voltage pulse at the GO_LS node, outputs a voltage pulse to set the example latch 120 after a delay corresponding to the LS length, thereby causing the latch 120 to output a high voltage at the HIZ node to cause the transistor driver 128 to initiate HIZ control of the example buck converter 100. The HIZ control is maintained until the Vout drops below the target Vout, where the process repeats.

At the transition from LS control to HIZ control (e.g., at the falling edge of the pulse to enable LS control or the rising edge of the output of the example latch 120), the example latch comparator 110 measures the voltage differential between the source and drain of the example LS transistor 104 to determine if, during the LS control, the IL becomes negative. If the example latch comparator 110 determines that the IL current was negative during the LS control duration, the example latch comparator 110 outputs a low voltage to the example LS controller 116. Otherwise, the example latch comparator 110 outputs a high voltage to the example LS controller 116. The example LS controller 116 increases the LS control duration (e.g., LS length) for a subsequent LS pulse when the output of the latch comparator 110 is a high voltage and decreases the LS control duration (e.g., LS length) for a subsequent LS pulse and decreases the LS control duration for a subsequent LS pulse when the output of the latch comparator 110 is a low voltage. The example LS controller 116 outputs the subsequent LS pulse duration to the example HS controller 122 and the example digitally controlled delay 118, as described above. The example HS controller 122 increases the HS control duration (e.g., HS length) for a subsequent HS pulse when the sum of the LS length and the HS length is less than the target PFM pulse length and decreases the HS control duration (e.g., HS length) for a subsequent HS pulse when the sum of the LS length and the HS length is more than the target PFM pulse length. In this manner, the LS pulse duration and the HS pulse duration toggle between different lengths to best satisfy the PFM pulse length target, maintain the target Vout, and reduce current ripple variations.

Figure 2A:
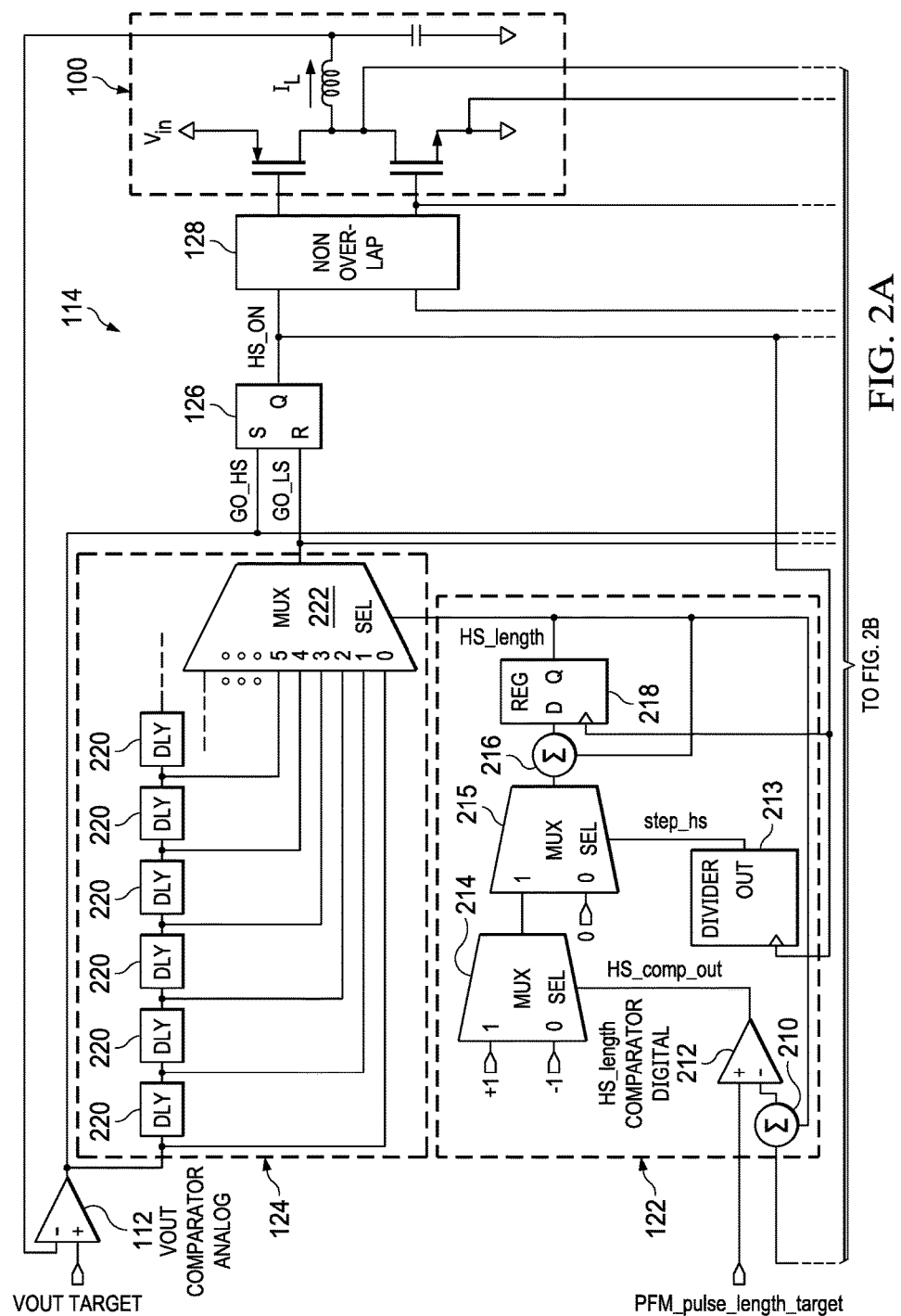
FIGS. 2A and 2B are a circuit implementation of an example digital PFM controller of FIG. 1.
Figure 2B:
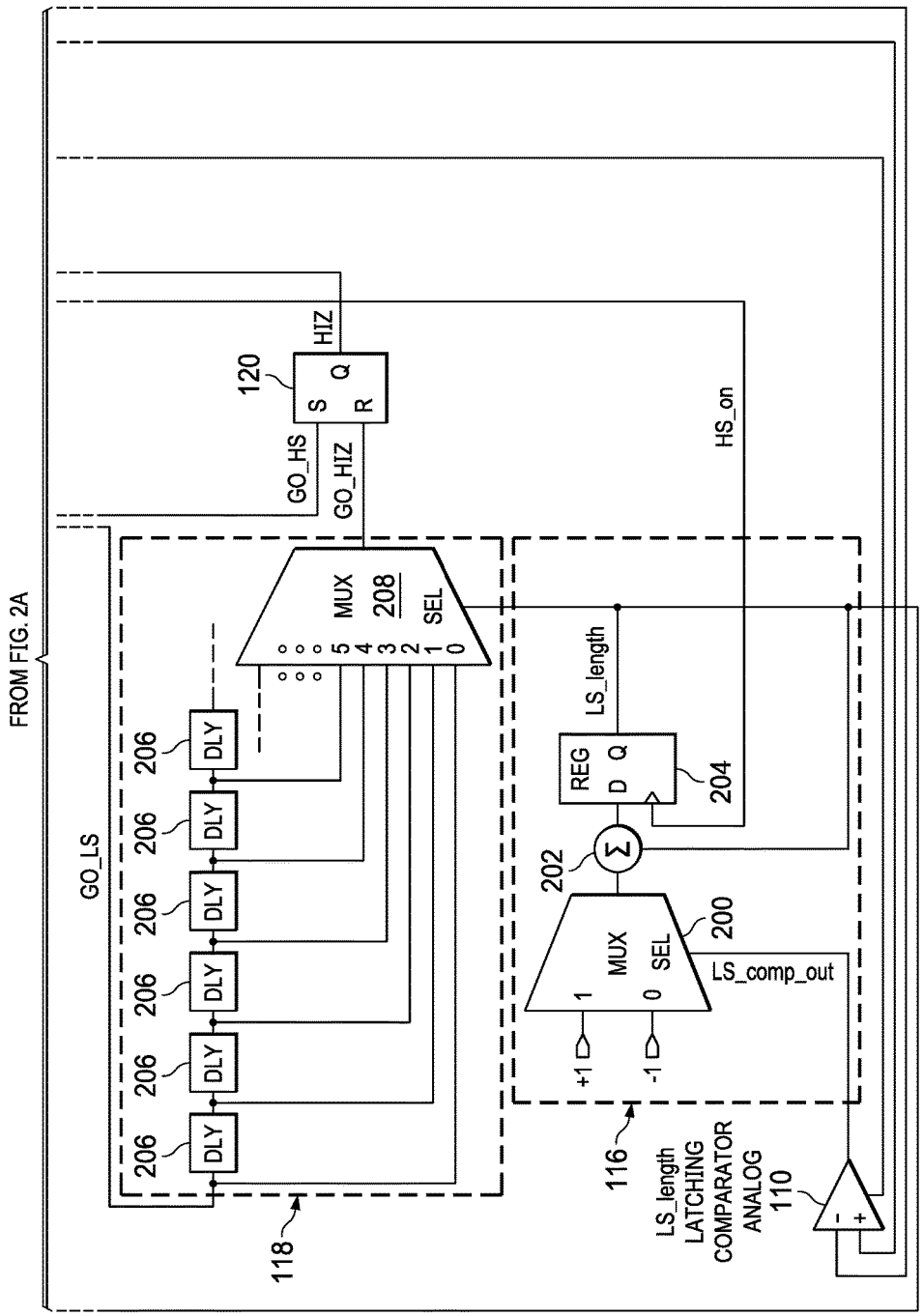

FIGS. 2A and 2B is a circuit implementation of an example digital PFM controller 114 of FIG. 1. FIGS. 2A and 2B includes the example buck converter 100, the example comparators 110, 112, the example digital PFM controller 114, the example LS controller 116, the example digitally controlled delay 118, the example latch 120, the example HS controller 122, the example digitally controlled delay 124, the example latch 126, and the example transistor driver 128 of FIG. 1. The example LS controller 116 includes an example multiplexer (MUX) 200, an example summer 202, and an example register 204. The example digitally controlled delay 118 includes example delay circuits 206 and an example MUX 208. The example HS controller 122 includes an example summer 210, an example comparator 212, an example divider 213, an examples MUX 214, 215, and an example register 218. The example digitally controlled delay 124 includes example delay circuits 220 and an example MUX 222.

As described above in conjunction with FIG. 1, the example LS controller 116 increases and/or decreases the duration/length of the LS pulse corresponding to how long the LS control of the example buck converter 100 is enabled for. The example LS controller 116 increases the LS pulse duration for a subsequent period when the output of the latch comparator 110 is a high voltage and decreases the LS pulse duration for the subsequent period when the output of the latch comparator is a low voltage. As described above, the output of the example latch comparator 110 is low if the IL current become negative after the LS transistor 104 is disabled (e.g., at the end of the LS control duration) and the output of the example latch comparator 110 is high if the IL current does not become negative after the LS transistor 104 is disabled (e.g., at the end of the LS control duration). The select input of the example MUX 200 of FIGS. 2A and 2B receives the output of the latch comparator 110 (e.g., at the LS_comp_out node). The other inputs of the example MUX 200 correspond to a +1 and a −1, where +1 corresponds to a positive unit of measure and −1 corresponds to a negative unit of measure. The unit of measure may be any unit of measure (e.g., a nanosecond, a fraction of a nanosecond, etc.) In this manner, if the output of the example latch comparator 110 is a low voltage, the example MUX 200 outputs a −1 and, if the output of the example latch comparator 110 is a high voltage, the example MUX 200 outputs a +1.

The example summer 202 of FIGS. 2A and 2B sums the output of the example MUX 200 (e.g., −1 or +1) with the previously stored LS length corresponding to the previous LS pulse duration. In this manner, the subsequent LS length will be either one unit larger or one unit smaller than the previously used LS length based on the output of the example latch comparator 110. In some examples, when PFM is initiated, the LS length is initiated to a preset value. The output of the example summer 202 (e.g., the sum of the previous LS_length with the output of the example MUX 200) is received by the example register 204.

The example register 204 of FIGS. 2A and 2B, stores the output of the example summer 202 when the output of the example comparator 112 rises to a high voltage level (e.g., based on the rising edge of the voltage at the HS_on node). The example register 204 outputs the stored value for a duration corresponding to when the input is stored until a subsequent rising edge of the voltage at the HS_on node. The output of the register 204 corresponding to the LS pulse duration/length is received by the example summer 202, the example select input of the example MUX 208, and the example summer 210, as further described below.

As described above in conjunction with FIG. 1, the example digitally controlled delay 118 receives a signal (e.g., voltage pulse) corresponding to the end of the high-side control and beginning of the LS control based on a voltage pulse at the Go_LS node. The voltage pulse on the Go_LS node is passed through the example delay circuits 206 to delay the pulse corresponding to the LS length/duration. In this manner, LS control is held until the delayed voltage pulse is output by the example MUX 208 on the Go_HIZ node, thereby initiating HIZ control. The example delay circuits 206 may be buffers and/or any other circuitry to output a time-shifted input. Because the example register 204 outputs the LS length to the select input of the example MUX 208, the MUX 208 enables one of the delayed voltage pulses based on the LS length. For example, if the LS length corresponds to no delay (e.g., 0), the MUX 208 outputs the voltage pulse without any delay to initiate the HIZ control, if the LS length corresponds to a small delay (e.g., '1') the MUX 208 outputs the pulse at the Go_HIZ node after being passed through a first delay circuit 206, if the LS length corresponds to more delay (e.g., '2') the MUX 208 outputs the pulse at the Go_HIZ node after being passed through a first and second delay circuit 206, etc. In this manner, the signal at the LS_length node directly corresponds to a duration of LS control (e.g., by ending the LS control based on the LS_length).

As described above in conjunction with FIG. 1, the example HS controller 122 increases and/or decreases the duration/length of the HS pulse corresponding to how long the HS control of the example buck converter 100 is enabled for. For example, the example summer 210 receives the LS length from the example register 204 of the LS controller 116 and the HS length corresponding to a previous HS pulse from the example register 218 of the example HS controller 122. In some examples, when PFM is initiated, the HS length is initiated to a preset value. The example summer 210 sums the HS length and the LS length and outputs the sum to the example comparator 212.

The example comparator 212 of FIGS. 2A and 2B compares the sum of the HS length and the LS length with a target PFM pulse length. As described above, the target PFM pulse length corresponds to a preset value. In some examples, the target PFM pulse length is based on a pulse width modulation (PWM) mode of the buck converter 100. Accordingly, if the sum of the HS length and the LS length is more than the target PFM pulse length, the example comparator 212 outputs a low voltage at the HS_comp_out node and, if the sum of the HS length and the LS length is less than the target PFM pulse length, the example comparator 212 outputs a high voltage at the HS_comp_out node. The output of the example comparator 212 is received at the select input of the example MUX 214. The other inputs of the example MUX 214 correspond to a +1 and a −1, where +1 corresponds to a positive unit of measure and −1 corresponds to a negative unit of measure. In this manner, if the output of the example comparator 212 is a low voltage, the example MUX 214 outputs a −1 and, if the output of the example comparator 212 is a high voltage, the example MUX 214 outputs a +1.

In some examples, when the HS length is changed, the current LS length may need to be adapted for every HS length change. Additionally, changes in Vin will cause the slope of the inductor current to change during HS control. Accordingly, HS length may need to be adapted much slower than LS length (e.g., LS length is updated every pulse while HS length is updated every 5 pulses). Accordingly, in some examples, the example divider 213 and the example MUX 215 may be implemented to adjust the HS length adaptation rate to a slower rate (e.g., every 5 pulses, for example). The rate of adaptation may depend on a difference between the inductor current slope during HS control and during LS control. The example divider 213 of FIGS. 2A and 2B receives the signal at the HS_on node corresponding to the output of the example latch 126. In this manner, the HS length register 218 holds the value for a preferred amount of PFM cycles. When the output of the example divider 213 is high the input for the example MUX 215 the input corresponding to the output of the MUX 214 is selected to be output to the example summer 216. Otherwise, a zero output is selected to be output to the example summer 216. In this manner, the HS length may be updated every X number of PFM pulses.

The example summer 216 of FIGS. 2A and 2B sums the output of the example MUX 214 (e.g., −1 or +1) with the previously stored HS length corresponding to the previous HS pulse duration (e.g., when step_hs is high). In this manner, the subsequent HS length will be either one unit measurement larger or one unit measurement smaller than the previously used HS length based on a comparison between the sum of the HS length and the LS length and the target PFM pulse length. In some examples, when PFM is initiated, the HS length is initiated to a preset value. The output of the example summer 216 (e.g., the sum of the previous HS length with the output of the example MUX 214) is received by the example register 218.

The example register 218 of FIGS. 2A and 2B, stores the output of the example summer 216 when the output of the example comparator 112 rises to a high voltage level (e.g., based on the rising edge of the voltage at the HS_on node). The example register 218 outputs the stored value for a duration corresponding to when the input is stored until a subsequent rising edge of the voltage at the HS_on node. The output of the register 218 corresponding to the HS pulse duration/length is received by the example summer 216, the example select input of the example MUX 222, and the example summer 210, as further described below.

As described above in conjunction with FIG. 1, the example digitally controlled delay 124 receives a signal (e.g., voltage pulse) corresponding to the start of the high-side control based on the rising edge of a voltage pulse at the output of the example comparator 112 (e.g., at the Go_HS node). The voltage pulse on the Go_HS node is passed through the example delay circuits 220 to delay the pulse corresponding to the HS length/duration. In this manner, HS control is held until the delayed voltage pulse is output by the example MUX 222 on the Go_LS node, thereby initiating LS control. The example delay circuits 220 may be buffers and/or any other circuitry to output a time-shifted input. Because the example register 218 outputs the HS length to the select input of the example MUX 222, the MUX 222 enables one of the delayed voltage pulses based on the HS length. For example, if the HS length corresponds to no delay (e.g., 0), the MUX 222 outputs the voltage pulse without any delay to initiate the LS control, if the HS length corresponds to a small delay (e.g., '1') the MUX 222 outputs the pulse at the Go_LS node after being passed through a first delay circuit 220, if the LS length corresponds to more delay (e.g., '2') the MUX 222 outputs the pulse at the Go_LS node after being passed through a first and second delay circuit 220, etc. In this manner, the signal at the HS length node directly corresponds to a duration of HS control (e.g., by ending the HS control based on the HS_length).

While an example manner of implementing the example digital PFM controller 114 of FIGS. 1 and 2A/2B is illustrated in FIGS. 1 and 2A/2B, one or more of the elements, processes and/or devices illustrated in FIGS. 1 and 2A/2B may be combined, divided, re-arranged, omitted, eliminated and/or implemented in any other way. Further, the example latch comparator 110, the example comparator 112, the example LS controller 116, the example digitally controlled delay 118, the example latch 120, the example HS controller 122, the example digitally controlled delay 124, the example latch 126, the example transistor driver 128, the example MUXs 200, 208, 214, 215, 222, the example divider 213, the example summers 202, 210, 216, the example registers 204, 218, the example delay circuits 206, 220, and/or, more generally, the example digital PFM controller 114 of FIGS. 1, 2A, and/or 2B may be implemented by hardware, software, firmware and/or any combination of hardware, software and/or firmware. Thus, for example, any of the example latch comparator 110, the example comparator 112, the example LS controller 116, the example digitally controlled delay 118, the example latch 120, the example HS controller 122, the example digitally controlled delay 124, the example latch 126, the example transistor driver 128, the example MUXs 200, 208, 214, 215, 222, the example divider 213, the example summers 202, 210, 216, the example registers 204, 218, the example delay circuits 206, 220, and/or, more generally, the example digital PFM controller 114 of FIGS. 1, 2A, and/or 2B could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example latch comparator 110, the example comparator 112, the example LS controller 116, the example digitally controlled delay 118, the example latch 120, the example HS controller 122, the example digitally controlled delay 124, the example latch 126, the example transistor driver 128, the example MUXs 200, 208, 214, 215, 222, the example divider 213, the example summers 202, 210, 216, the example registers 204, 218, the example delay circuits 206, 220, and/or, more generally, the example digital PFM controller 114 of FIGS. 1, 2A, and/or 2B is/are hereby expressly defined to include a non-transitory computer readable storage device or storage disk such as a memory, a digital versatile disk (DVD), a compact disk (CD), a Blu-ray disk, etc. including the software and/or firmware. Further still, the example digital PFM controller 114 of FIGS. 1, 2A, and/or 2B may include one or more elements, processes and/or devices in addition to, or instead of, those illustrated in FIGS. 1, 2A, and/or 2B, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
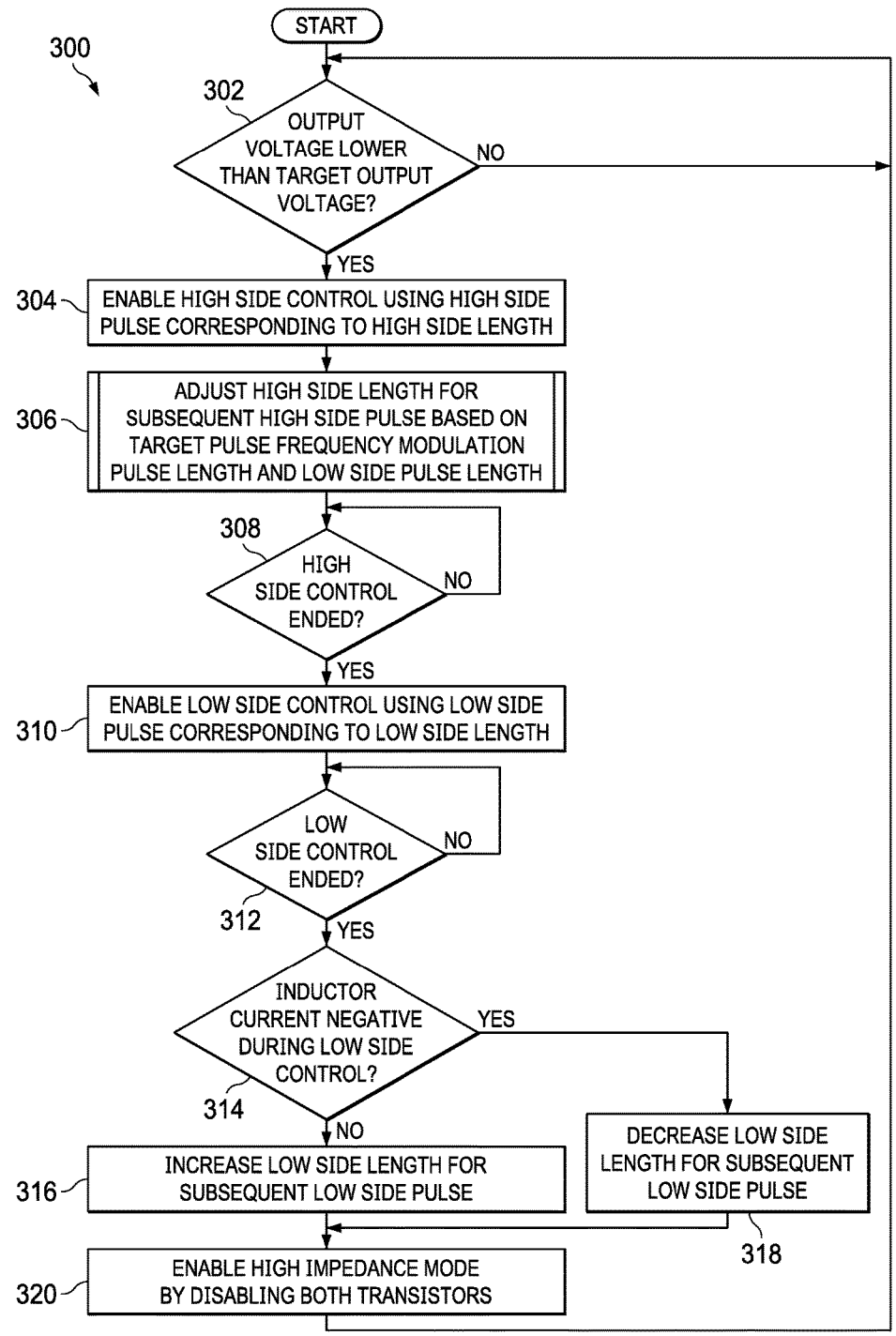
FIGS. 3-4 are a flowcharts representative of example machine readable instructions that may be executed to implement the example PFM controller of FIGS. 1 and 2A/2B.
Figure 4:
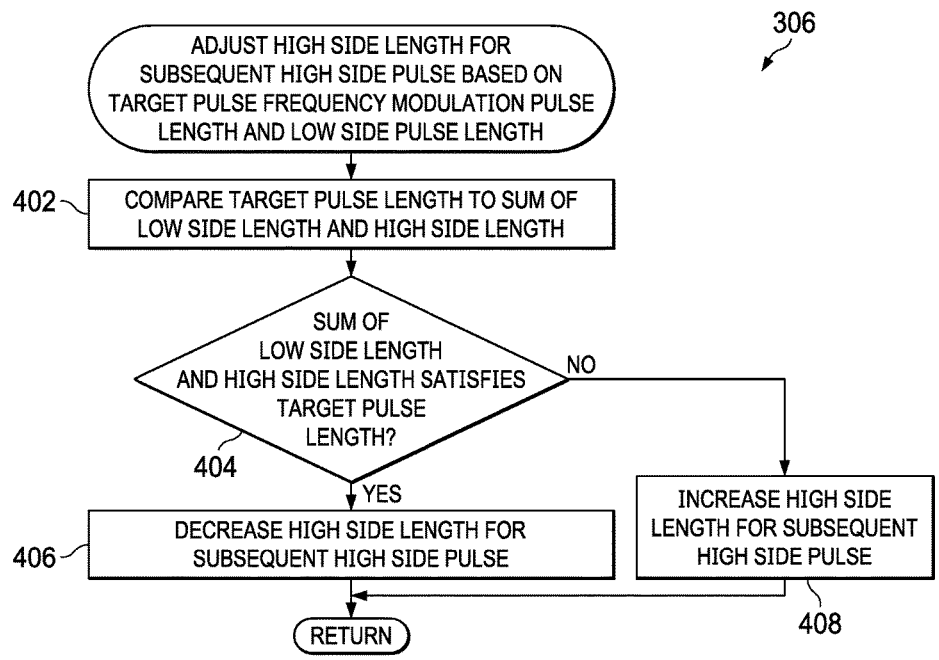

A flowchart representative of example hardware logic or machine readable instructions for implementing the example digital PFM controller 114 of FIGS. 1, 2A, and/or 2B is shown in FIGS. 3-4. The machine readable instructions may be a program or portion of a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 4, many other methods of implementing the example digital PFM controller 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 3 is an example flowchart 300 representative of example machine readable instructions that may be executed by the example digital PFM controller 114 of FIGS. 1 and 2A/2B to digitally control pulse frequency modulation pulses in power converters (e.g., the example buck converter 100 of FIGS. 1 and 2A/2B. Although the example flowchart 300 of FIG. 3 is described in conjunction with the example digital PFM controller 114 and the example buck converter 100 FIGS. 1, 2A, and/or 2B, the flowchart 300 may be used in conjunction with any type of digital PFM controller and/or any type of power converter.

At block 302, the example comparator 112 determines if the output voltage (Vout) is lower than (e.g., satisfies) the target Vout. If the example comparator 112 determines that the Vout is not lower than (e.g., does not satisfy) the target Vout (block 302: NO), the process returns to block 302 until the Vout is lower than the target Vout. If the example comparator 112 determines that the Vout is lower than the target Vout (block 302: YES), the example transistor driver 128 enables HS control using a voltage pulse corresponding to a high-side length/duration (e.g., applied at the gate of the example HS transistor 102) (block 304). For example, when the example comparator 112 determines that the Vout is lower than the target Vout, the output of the comparator 112 rises to a high voltage to set the example latch 126 to send a high voltage to the example transistor driver 128. When the example transistor driver 128 receives the high voltage from the example latch 126, the example transistor driver 128 outputs a high voltage to the gate of the example HS transistor 102 to enable the HS transistor 102. Additionally, the example transistor driver 128 outputs a low voltage to the gate of the example LS transistor 104 to disable the LS transistor 104.

At block 306, the example digital PFM controller 114 adjusts the HS length for a subsequent HS pulse based on the target PFM pulse length and the LS pulse length, as further described below in conjunction with FIG. 4. At block 308, the example transistor driver 128 determines if the high-side control has ended. The example transistor driver 128 determines the high-side control ends when the output of the latch 126 reduces to a low voltage (e.g., when the example latch 126 is reset by a voltage pulse on the Go_LS node. The example digitally controlled delay 124 outputs the voltage pulse on the Go_LS node based on a delay corresponding to the HS duration/length determined by the example HS controller 122. Accordingly, the example transistor driver 128 determines that high-side control has ended based on the delay caused by the example digitally controlled delay 124 in conjunction with the HS controller 122.

If the example transistor driver 128 determines that the high-side control has not ended (block 308: NO), the process returns to block 308 until the high-side control ends. If the example transistor driver 128 determines that the high-side control has ended (block 308: YES), the example transistor driver 128 enables low-side control using a LS pulse corresponding to the LS length (block 310). For example, when the example delay circuits 220 of the example digitally controlled delay 124 generates a delayed voltage pulse based on the HS length output of the example HS controller 122, the example MUX 222 outputs the delayed voltage pulse at the Go_LS node, thereby resetting the example latch 126. Resetting the example latch 126 cause the output of the example latch 126 to drop to a low voltage. As described above in conjunction with FIG. 1, when the output of the example latch 126 is low, the example transistor driver 128 enables LS control by transmitting a low signal to the gate of the example HS transistor 102 and a high signal to the gate of the example LS transistor 104, to disable the HS transistor 102 and enable the LS transistor 104.

At block 312, the example transistor driver 128 determines if the LS control has ended. The example transistor driver 128 determines that LS control has ended when the example transistor driver 128 receives a high pulse from the output of the example latch 120 (e.g., when the example latch 120 is set by a voltage pulse on the Go_HIZ node). The example digitally controlled delay 118 outputs the voltage pulse on the Go_HIZ node based on a delay corresponding to the LS duration/length determined by the example LS controller 116. Accordingly, the example transistor driver 128 determines that LS control has ended based on the delay caused by the example digitally controlled delay 118 in conjunction with the LS controller 116.

If the example transistor driver 128 determines that the LS control has not ended (block 312: NO), the process returns to block 312 until the LS control has ended. If the example transistor driver 128 determines that the LS control has ended (block 312: YES), the example latch comparator 110 determines if the inductor current (IL) is negative after the LS control (block 314). For example, the latch comparator 110 may compare the voltage across the source and drain of the LS transistor 104 to determine if the inductor current is positive or negative when the LS control ends (e.g., based on the falling edge of the voltage applied to the gate of the LS transistor 104). If the example latch comparator 110 determines that the inductor current is not become negative at the end of the LS control (block 314: NO), the example LS controller 116 increases the LS length for a subsequent low-side pulse (block 316). For example, when the latch comparator 110 determines that the inductor current has not become negative, the latch comparator 110 outputs is a high voltage to cause the MUX 200 to output a +1 unit of measurement, thereby increasing (e.g., via the example summer 202) the current LS length. The increased LS length is stored in the example register 204 for the subsequent LS pulse. If the example latch comparator 110 determines that the inductor current is negative at the end of the LS control (block 314: YES), the example LS controller 116 decreases the LS length for a subsequent low-side pulse (block 318). For example, when the latch comparator 110 determines that the inductor current has become negative, the latch comparator 110 outputs is a low voltage to cause the example MUX 200 to output a −1 unit of measurement, thereby decreasing (e.g., via the example summer 202) the current LS length. The decreased LS length is stored in the example register 204 for the subsequent LS pulse. At block 320, the example transistor driver 128 enables high impedance (HIZ) mode by disabling the example transistors 102, 104. For example, the transistor driver 128 transmits a low voltage to the gates of the example transistors 102, 104 to disable the transistors 102, 104 to reduce the IL to zero.

FIG. 4 is an example flowchart 306 representative of example machine readable instructions that may be executed by the example digital PFM controller 114 of FIGS. 1 and 2A/2B to adjust the HS length for a subsequent HS pulse based on the target PFM pulse length and the LS pulse length, as described above in conjunction with block 306 of FIG. 3.

At block 402, the example comparator 212 compares the target pulse length to the sum of the LS length and the HS length. As described above, the target PFM pulse length corresponds to a preset value. In some examples, the target PFM pulse length is based on a pulse width modulation (PWM) mode of the buck converter 100. The example summer 210 determines the sum the LS length from the example LS controller 116 and the HS length. At block 404, the example comparator 212 determines if the sum of the LS length and the HS length satisfies (e.g., is larger than) the target pulse length.

If the example comparator 212 determines that the sum of the LS length and the HS length satisfies (e.g., is larger than) the target pulse length (block 404: YES), the example HS controller 122 decreases the HS length for a subsequent HS pulse (block 406). For example, when the comparator 212 determines that the target pulse length is not larger than the sum of the LS length and the HS length, the comparator 212 outputs is a low voltage to cause the MUX 214 to output a −1 unit of measurement, thereby decreasing (e.g., via the example summer 216) the current HS length (e.g., based on the division of the example divider 213). The decreased HS length is stored in the example register 218 for the subsequent HS pulse. If the example comparator 212 determines that the sum of the LS length and the HS length does not satisfy (e.g., is less than) the target pulse length (block 404: NO), the example HS controller 122 increases the HS length for a subsequent low-side pulse (block 408). For example, when the comparator 212 determines that the target pulse length is larger than the sum of the LS length and the HS length, the comparator 212 outputs a high voltage to cause the MUX 214 to output a +1 unit of measurement, thereby increasing (e.g., via the example summer 216, based on the division of the example divider 213) the current HS length. The increased HS length is stored in the example register 218 for the subsequent HS pulse.

Figure 5:
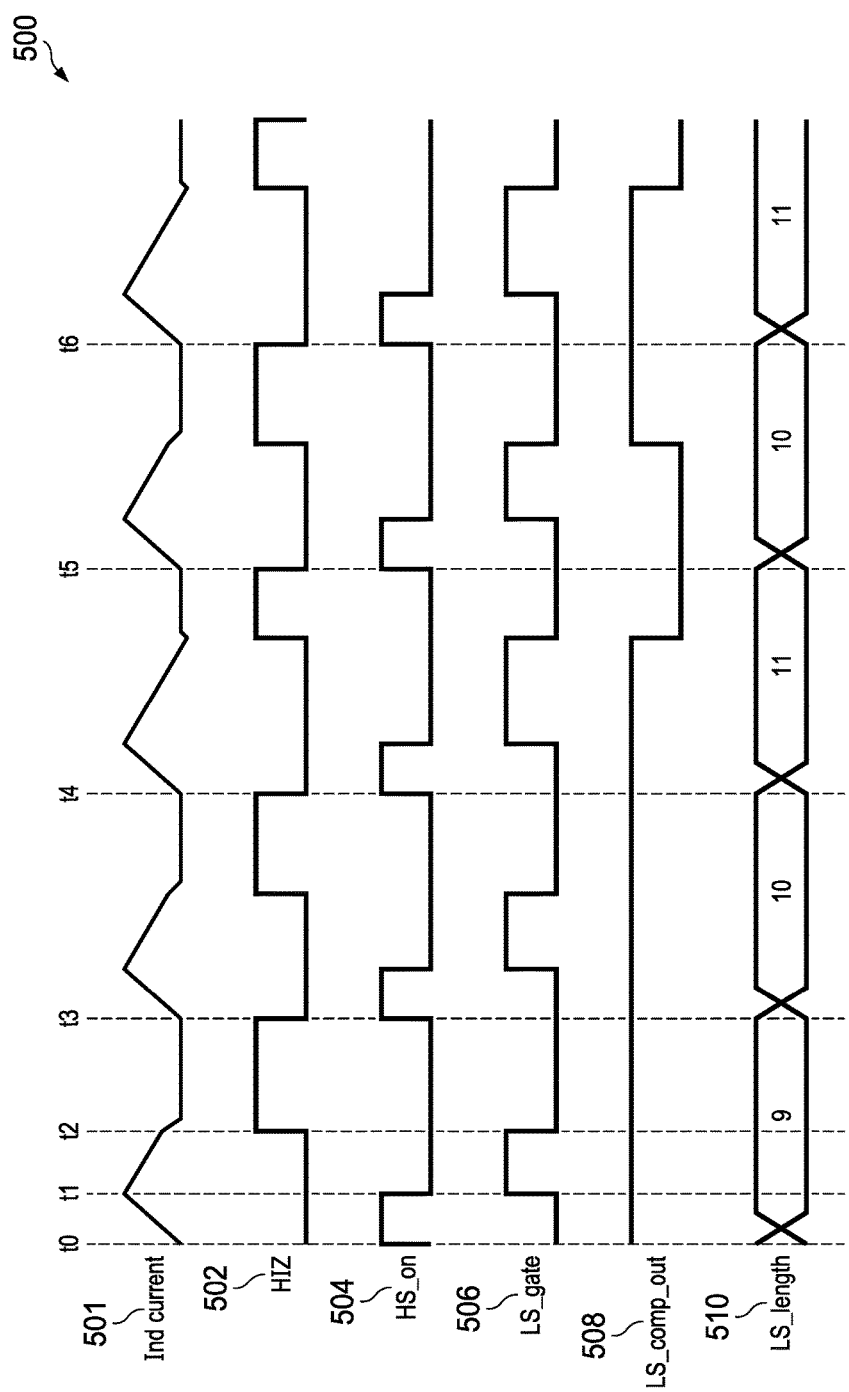
FIGS. 5 and 6 are timing diagrams corresponding to the digitally controlled PFM used to control the example buck converter of FIG. 1.

FIG. 5 is an example timing diagram 500 corresponding to the digitally controlled PFM used to determine the low-side length (e.g., duration of the low-side control) of the example buck converter 100 of FIGS. 1, 2A, and/or 2B. The example timing diagram 500 includes an example inductor current 501, an example HIZ voltage 502, an example HS_on voltage 504, an example LS_gate voltage 506, an example LS_comp_out voltage 508, and an example LS_length 510. The example inductor current 501 corresponds to the inductor current of the example buck converter 100 of FIGS. 1, 2A, and/or 2B, the example HIZ voltage 502 corresponds to the voltage at the HIZ node of FIGS. 1, 2A, and/or 2B (e.g., the output of the example latch 120), the example HS_on voltage 504 corresponds to the voltage at the HS_on node of FIGS. 1, 2A, and/or 2B (e.g., the output of the example latch 126), the example LS_gate 506 corresponds to the voltage at the LS_gate node of FIGS. 1, 2A, and/or 2B (e.g., the node between the example transistor driver 128 and the example LS transistor 104), the example LS_comp_out 508 corresponds to the voltage at the LS_comp_out node of FIGS. 1, 2A, and/or 2B (e.g., the output of the example comparator 110), and the example LS_length 510 corresponds to the output of the LS controller 116 of FIGS. 1, 2A, and/or 2B (e.g., the example register 204 of FIGS. 2A and 2B). Although the example timing diagram 500 of FIG. 5 corresponds to the example digital PFM controller 114 and the example buck converter 100 of FIGS. 1, 2A, and/or 2B, the example timing diagram 500 may be used to describe other PFM controllers and/or power converters.

At time t0, the output voltage of the example buck converter 100 is below the target output voltage. Accordingly, the example comparator 112 outputs a high voltage pulse on the example GO_HS node, thereby setting the example latch 126 and resetting the example latch 120. Thus, the example latch 126 pulses the example HS_on voltage 504 (e.g., for a duration corresponding to the HS_length) and the example transistor driver 128 sets the example LS_gate voltage 506 to a low voltage, thereby enabling the example HS transistor 102 and disabling the example LS transistor 104 to cause the inductor current 501 to increase. Additionally, at time t0 the example register 204 initiates the example LS_length to 9 and the example comparator 110 imitates the example LS_comp_out voltage 508 is initiated to a high voltage.

At time t1 (e.g., once the HS_length has ended), the example HS control ends, thereby decreasing the example HS_on voltage 504 to a low voltage. As described above, decreasing the example HS_on voltage 504 to a low voltage causes the example transistor driver 128 to increase the LS_gate voltage 506, to enable LS control. The length of the pulse for the example LS_gate voltage 506 corresponds to the example LS_length 510. Accordingly, the length of the pulse for the LS_gate voltage 506 corresponds to 9 units (e.g., 9 nanoseconds). As described above, the example LS_gate voltage 506 enables LS control to cause the example inductor current 501 to decrease.

At time t2, the example LS control ends and the example HIZ control begins. Accordingly, the example LS_gate voltage 506 drops to a low voltage and the example HIZ voltage 502 increases to a high voltage, thereby causing the example inductor current 501 to drop to zero. Additionally, at time t2, the example LS controller 116 determines whether the example LS_comp_out voltage 508 is a high voltage or a low voltage. Because the inductor current 501 is not negative at the end of LS control of the example LS_gate 506, the example latch comparator 110 outputs a high voltage for the LS_comp_out voltage 508 and the example LS controller 116 increases the example LS_length 510 for the next duration (e.g., starting at time t3). The pulse of the example HIZ voltage 502 is held high until the output voltage of the example buck converter 100 is less than the target output voltage (e.g., at time t3), and the process repeats.

At time t3, the process repeats based on the new LS_length 510 (e.g., 10 units). Accordingly, from t3 to t4, the pulse for the example LS_gate voltage 506 is slightly longer than from t0-t3. From t3-t4, the example inductor current 501 does not become negative during the high pulse for the example LS_gate voltage 506. Accordingly, the example LS controller 116 increases the example LS_length 510 from 10 units to 11 units for the next period (e.g., from t4-t5). At t5, the example inductor current 501 is not negative at the end of the high pulse for the example LS_gate voltage 506, thereby causing the example LS_comp_out voltage 508 to drop to a low voltage. Accordingly, the example LS controller 116 decreases the example LS_length 510 from 11 units to 10 units for the next period (e.g., from t5-t6). Accordingly, the process will continue to toggle from the example LS_length of 10 to the example LS_length of 11 unless a change occurs. For example, if the input voltage varies, the inductor current 501 may vary (e.g., increase faster or slower) to cause the LS_length 510 to vary.

Figure 6:
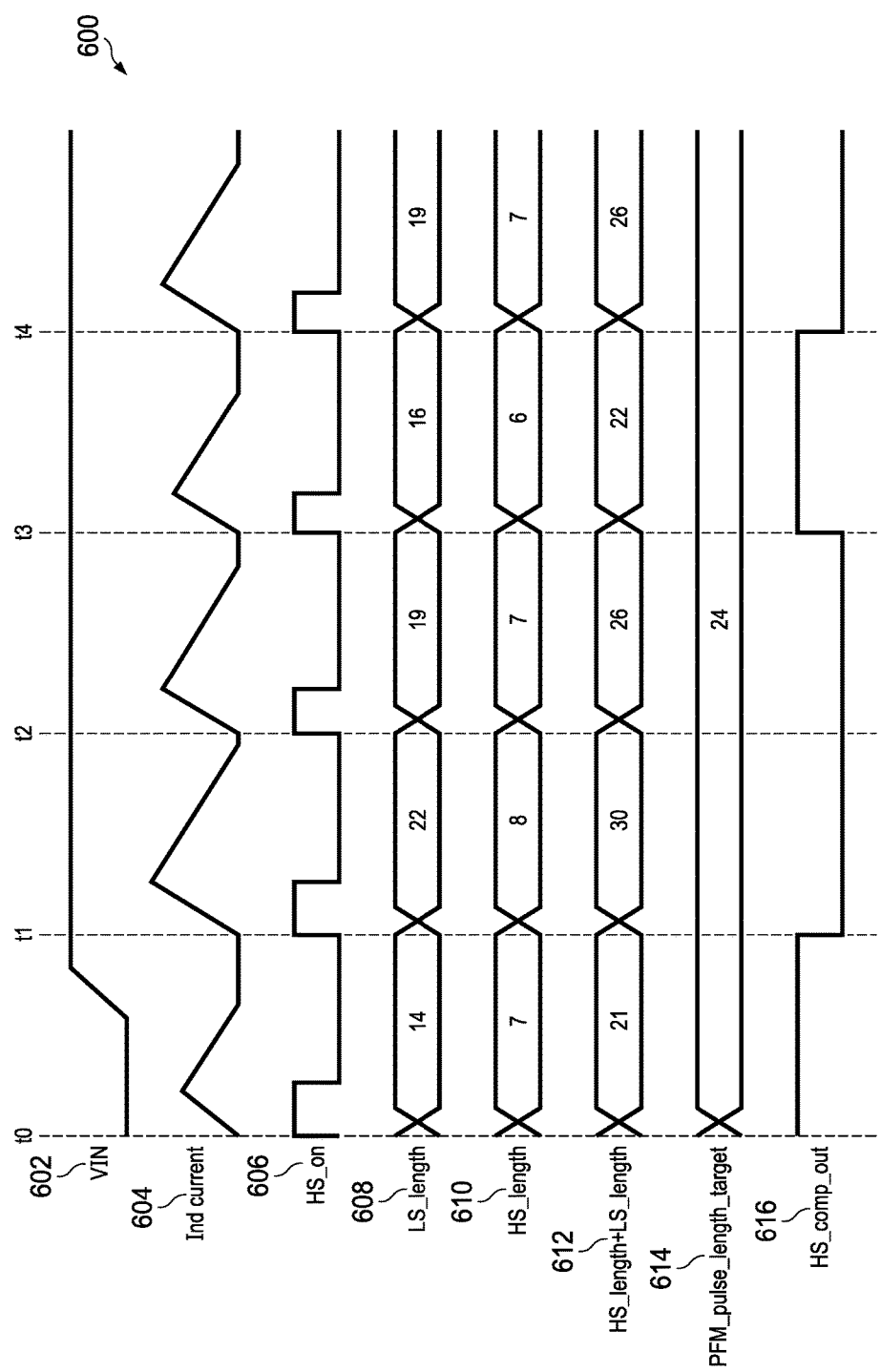

FIG. 6 is an example timing diagram 600 corresponding to the digitally controlled PFM used to determine the low-side length (e.g., duration of the low-side control) and the high-side length (e.g., duration of high-side control) of the example buck converter 100 of FIGS. 1, 2A, and/or 2B. The example timing diagram 600 includes an example input voltage (Vin) 602, an example inductor current 604, an example HS_on voltage 606, an example LS_length 608, and example HS_length 610, an example HS+LS length 612, an example PFM_pulse_target_length 614, and an example HS_comp_output. The example Vin 602 corresponds to the input voltage of the example buck converter 100 of FIGS. 1, 2A, and/or 2B, the example inductor current 604 corresponds to the inductor current of the example buck converter 100 of FIGS. 1, 2A, and/or 2B, the example HS_on voltage 606 corresponds to the voltage at the HS_on node of FIGS. 1, 2A, and/or 2B (e.g., the output of the example latch 126), the example LS_length 608 corresponds to the voltage at the LS_length node of FIGS. 1, 2A, and/or 2B (e.g., the output of the LS controller 116 of FIGS. 1, 2A, and/or 2B and the output of the example register 204 of FIGS. 2A and 2B), the example HS_length 610 corresponds to the voltage at the HS_length node of FIGS. 1, 2A, and/or 2B (e.g., the output of the example HS controller 122 and the output of the example register 218 of FIGS. 2A and 2B), the example HS_length+LS_length 612 corresponds to the output of the example summer 210 of FIGS. 2A and 2B, the example PFM_pulse_length_target 614 corresponds to the example target PFM pulse length input of FIGS. 1, 2A, and/or 2B, and the example HS_comp_out 616 corresponds to the output of the example comparator 212 of FIGS. 2A and 2B. Although the example timing diagram 600 of FIG. 6 corresponds to the example digital PFM controller 114 and the example buck converter 100 of FIGS. 1, 2A, and/or 2B, the example timing diagram 600 may be used to describe other PFM controllers and/or power converters. The example of FIG. 6 updates the HS length with every update to the LS length (e.g., the using the example HS controller 122 of FIGS. 2A and 2B without the example divider 213 and the example MUX 215 to adjust the HS adjustment frequency). Alternatively, if the example divider 213 and the example MUX 215 of FIGS. 2A and 2B were implemented, the HS length may only be adjusted after X number of pulses (e.g., while the LS adjusts every pulse).

At time t0, the example input voltage 602 is at a first voltage level. Additionally, the LS controller 116 and the example HS controller 122 presets the values of the example LS_length 608 and the example HS_length 610 (e.g., 14 for LS and 7 for HS). Accordingly, the duration of the HS control within the first period (e.g., from t0-t1) corresponds to 7 units and the duration of the LS control within the first period correspond to 14 units. During the first period, the example HS_length+LS_length 612 (e.g., 14 units+7 units=21 units) is less than the example PFM_pulse_length_target 614 (e.g., 24 units). Thus, the example HS_comp_out voltage 616 is a high voltage. Accordingly, the example HS controller 122 will increase the HS_length 610 during the next period (e.g., from t1 to t2) (e.g., from 7 units to 8 units). Additionally, during the first period, the example LS controller 116 determines that the LS_length 608 will be increased (e.g., based on the output of the example comparator 110), as described above. Accordingly, the example LS_length 608 and the example HS_length 610 are increased for the second period. Additionally, within the first period, the example Vin 602 increases to a second voltage level, thereby affecting the slope of the example inductor current 604.

During the second period (e.g., from t1 to t2), the HS_length 608 is 22 units and the LS_length 610 is 8 units. LS length is assumed to be ideal or correctly adapted. Thus, the HS_length+LS_length 612 (e.g., 22 units+8 units=30 units) is larger than the PFM_pulse_length_target 614 (e.g., 24 units). Accordingly, the HS_comp_out voltage 616 decreases to a low voltage, thereby causing the HS_length 610 to decrease to a smaller unit length for the next period (e.g., from time t2 to t3). This process continues to increase and decrease the example LS_length 208 and/or the example HS_length 610 to maintain a total duration near the example PFM_pulse_length_target 614. In this manner, the optimal PFM may be maintained regardless of variations in the example Vin 602 and/or Vout.

Figure 7:
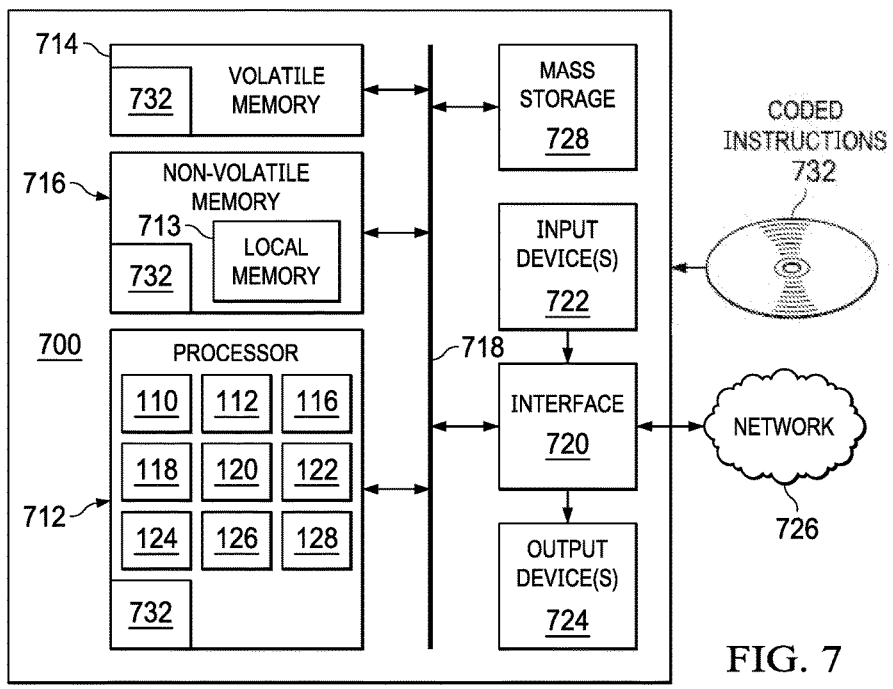
FIG. 7 is an example processor platform that may execute the example computer readable instructions of FIGS. 3-4 to implement the example digital PFM controller of FIGS. 1 and/or 2A/2B.

FIG. 7 is a block diagram of an example processor platform 700 structured to execute the instructions of FIGS. 3-4 to implement the example digital PFM controller 114 of FIGS. 1, 2A, and/or 2B. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example latch comparator 110, the example comparator 112, the example LS controller 116, the example digitally controlled delay 118, the example latch 120, the example HS controller 122, the example digitally controlled delay 124, the example latch 126, and/or the example transistor driver 128.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 3-4 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that digitally control pulse frequency modulation pulses in power converters. Examples disclosed herein provide a digitally adapted HS control length (e.g., duration) to generate a constant pulse length which improves the efficiency and keeps the output voltage ripple at a smaller level than conventional techniques. Additionally, examples disclosed herein provide seamless mode transmission from constant frequency pulse width modulation to pulse frequency modulation. Examples disclosed herein provide nearly instant reaction times in PFM, HS in the nanoseconds range with low quiescent current (IQ) and optimized efficiency. Because examples disclosed herein correspond to a digital PFM solution, examples disclosed herein do not require time to wake up analog circuits, thereby reducing the HS control duration and incurred IQ penalty to keep such analog circuits of conventional analog techniques. Examples disclosed herein support buck converters with down to 45 nanohenry inductors with up to a 15 Megahertz switching frequency.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a low-side controller structured to:
      when an inductor current corresponds to a first current direction during a first duration of a low-side control signal of a power converter, decrease a second duration of the low-side control after the first duration; and
      when the inductor current corresponds to a second current direction during the first duration of the low-side control signal of the power converter, increase the second duration of the low-side control after the first duration; and
   a high-side controller structured to:
      when a sum of the first duration and a third duration corresponding to a high-side control of the power converter does not satisfy a target pulse length, increase a fourth duration of the high-side control after the third duration; and
      when the sum of the first duration and the third duration satisfies the target pulse length, decrease the fourth duration of the high-side control after the third duration.

2. The apparatus of claim 1, further including at least one latch structured to trigger at least one of the high-side control or the low-side control of the power converter.

3. The apparatus of claim 2, further including:
   a first digitally controlled delay structured to receive the first duration and output a signal to the at least one latch to ensure the low-side control corresponds to the first duration; and
   a second digitally controlled delay structured to receive the third duration and output a signal to the at least one latch to ensure the high-side control corresponds to the third duration.

4. The apparatus of claim 1, further including a comparator structured to determine if the inductor current corresponds to the first current direction during the low-side control of the power converter.

5. The apparatus of claim 1, further including a comparator structured to determine when the sum of the first duration and the third duration is more than or less than the target pulse length.

6. The apparatus of claim 1, further including a driver structured to control at least one of a high-side transistor or a low-side transistor to enable at least one of the high-side control of the low-side control.

7. The apparatus of claim 1, further including a comparator structured to output a pulse when an output voltage of the power converter satisfies a target output voltage.

8. The apparatus of claim 7, wherein the pulse triggers at least one of the low-side controller of the high-side controller to perform a comparison.

9. An apparatus comprising:
a first comparator with a first comparator output coupled to a first latch and a first digitally controlled delay, the first comparator including a first comparator input coupled to an output of a power converter and a second comparator input coupled to a device providing a target output voltage;
a high-side controller coupled to a low-side controller output of a low-side controller;
the first digitally controlled delay coupled to a high-side controller output of the high-side controller;
the first latch coupled to a first digitally controlled delay output form the first digitally controlled delay; and
a driver coupled to a first latch output of the first latch, the driver including at least one of a first driver output coupled to a first transistor and a second driver output coupled to a second transistor of a power converter.

10. The apparatus of claim 9, wherein the high-side controller includes:
a first summer including a first summer input coupled to a low-side controller output and a second summer input coupled to the high-side controller output;
a second comparator including a third comparator input coupled to device providing a target pulse length a fourth comparator input coupled to a first summer output of the first summer;
a multiplexer including a first multiplexer input coupled to a positive unit value and a second multiplexer input coupled to a negative unit value, the multiplexer including a select input coupled to the first comparator output;
a second summer including a third summer input coupled to the high-side controller output and a fourth summer input coupled to the output of the multiplexer; and
a register coupled to the output of the second summer, the output of the second summer corresponding to the high-side controller output for subsequent high-side control.

11. The apparatus of claim 10, further including:
a divider coupled to the output of the first latch and a second select input of a second multiplexer; and
the second multiplexer including third multiplexer input coupled to the output of the multiplexer and a fourth multiplexer input coupled to a zero unit value, the second multiplexer including an output coupled to the second summer.

12. The apparatus of claim 9, wherein the first digitally controlled delay includes:
delay circuits coupled to the first comparator output; and
a multiplexer coupled to nodes between each of the delay circuits, the multiplexer including a select input coupled to the high-side controller output.

13. The apparatus of claim 9, wherein the first comparator output is coupled to a set input of the first latch and the first digitally controlled delay output is coupled to a reset input of the first latch.

14. The apparatus of claim 9, further including:
a low-side controller coupled to a second comparator output of a second comparator;
a second digitally controlled delay coupled to the first digitally controlled delay output from the first digitally controlled delay and a low-side controller output of the low-side controller; and
a second latch coupled to the first comparator output of the first comparator and a second digitally controlled delay output of the second digitally controlled delay, the driver being coupled to a second latch output of the second latch.

15. The apparatus of claim 14, wherein the low-side controller includes:
a multiplexer including a first multiplexer input coupled to a positive unit value and a second multiplexer input coupled to a negative unit value, the multiplexer including a select input couple to a second comparator output of a second comparator;
a first summer including a first summer input coupled to the low-side controller output and a second summer input coupled to the output of the multiplexer; and
a register coupled to the output of the first summer, the output of the first summer corresponding to the low-side controller output for subsequent low-side control.

16. The apparatus of claim 15, wherein the second comparator is coupled to a source of a low-side transistor of the power converter and a drain of the low-side transistor of the power converter.

17. The apparatus of claim 14, wherein the second digitally controlled delay includes:
delay circuits coupled to the high-side controller output; and
a multiplexer coupled to nodes between each of the delay circuits, the multiplexer including a select input couple to the low-side controller output.

18. The apparatus of claim 14, wherein the first comparator output is coupled to a reset input of the second latch and the second digitally controlled delay output is coupled to a set input of the second latch.

19. A method comprising:
when an inductor current corresponds to a first current direction during a low-side control signal of a power converter for a first duration, decreasing, by executing an instruction with a processor, a second duration of the low-side control after the first duration;
when the inductor current corresponds to a second current direction during the low-side control signal of the power converter for the first duration, increasing, by executing an instruction with the processor, the second duration of the low-side control after the first duration;
when a sum of the first duration and a third duration corresponding to a high-side control of the power converter does not satisfy a target pulse length, increasing, by executing an instruction with the processor, a fourth duration of the high-side control after the third duration; and
when the sum of the first duration and the third duration satisfies the target pulse length, decreasing, by executing an instruction with the processor, the fourth duration of the high-side control after the third duration.

20. The method of claim 19, further including:
outputting a first signal to at least one latch to ensure the low-side control corresponds to the first duration; and
outputting a second signal to the at least one latch to ensure the high-side control corresponds to the third duration.

* * * * *